United States Patent
Kiani et al.

(10) Patent No.: US 7,008,117 B2
(45) Date of Patent: Mar. 7, 2006

(54) OPTICAL CONNECTOR ASSEMBLY WITH FEATURES FOR EASE OF USE

(75) Inventors: Sepehr Kiani, Watertown, MA (US); Richard F. Roth, Brookline, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 10/745,475

(22) Filed: Dec. 23, 2003

(65) Prior Publication Data

US 2005/0135752 A1 Jun. 23, 2005

(51) Int. Cl.
G02B 6/38 (2006.01)
G02B 6/36 (2006.01)

(52) U.S. Cl. .............................. 385/58; 385/72; 385/94; 385/75

(58) Field of Classification Search .................. 385/58, 385/60, 72, 75, 77, 88, 94
See application file for complete search history.

(56) References Cited

U.S. PATENT DOCUMENTS

| | | | |
|---|---|---|---|
| 4,787,706 A | 11/1988 | Cannon, Jr. et al. | |
| 5,073,042 A * | 12/1991 | Mulholland et al. | 385/69 |
| 5,142,597 A * | 8/1992 | Mulholland et al. | 385/56 |
| 5,579,425 A | 11/1996 | Lampert et al. | |
| 5,909,526 A * | 6/1999 | Roth et al. | 385/78 |
| 6,296,398 B1 * | 10/2001 | Lu | 385/60 |
| 6,357,934 B1 * | 3/2002 | Driscoll et al. | 385/86 |
| 6,364,534 B1 * | 4/2002 | Lampert | 385/53 |
| 6,634,796 B1 * | 10/2003 | de Jong et al. | 385/56 |
| 2002/0159712 A1 * | 10/2002 | Holmquist | 385/70 |
| 2003/0044127 A1 | 3/2003 | Roth et al. | |

* cited by examiner

*Primary Examiner*—Chandrika Prasad
(74) *Attorney, Agent, or Firm*—Wolf, Greenfield & Sacks, P.C.

(57) ABSTRACT

An optical connector assembly including an adapter. Each piece of the connector includes a ferrule carrier that is mounted in a housing. An adapter is used to align the connector housings. The adapter has a latching member that includes an exposed surface. The surface is accessible such that it can be pressed by a human operator to unlatch a connector inserted into the adapter. When pressed, the latching member slides so that latching features on the member slide clear of complementary features on the connector housing, thereby allowing the connector to release from the adapter. The connector also includes visually distinctive chips that can be inserted in the ferrule carriers or the adapter. By matching the chips in the different components, an assembler can easily recognize the appropriate ferrule carrier to be inserted the appropriate adapter position.

38 Claims, 8 Drawing Sheets

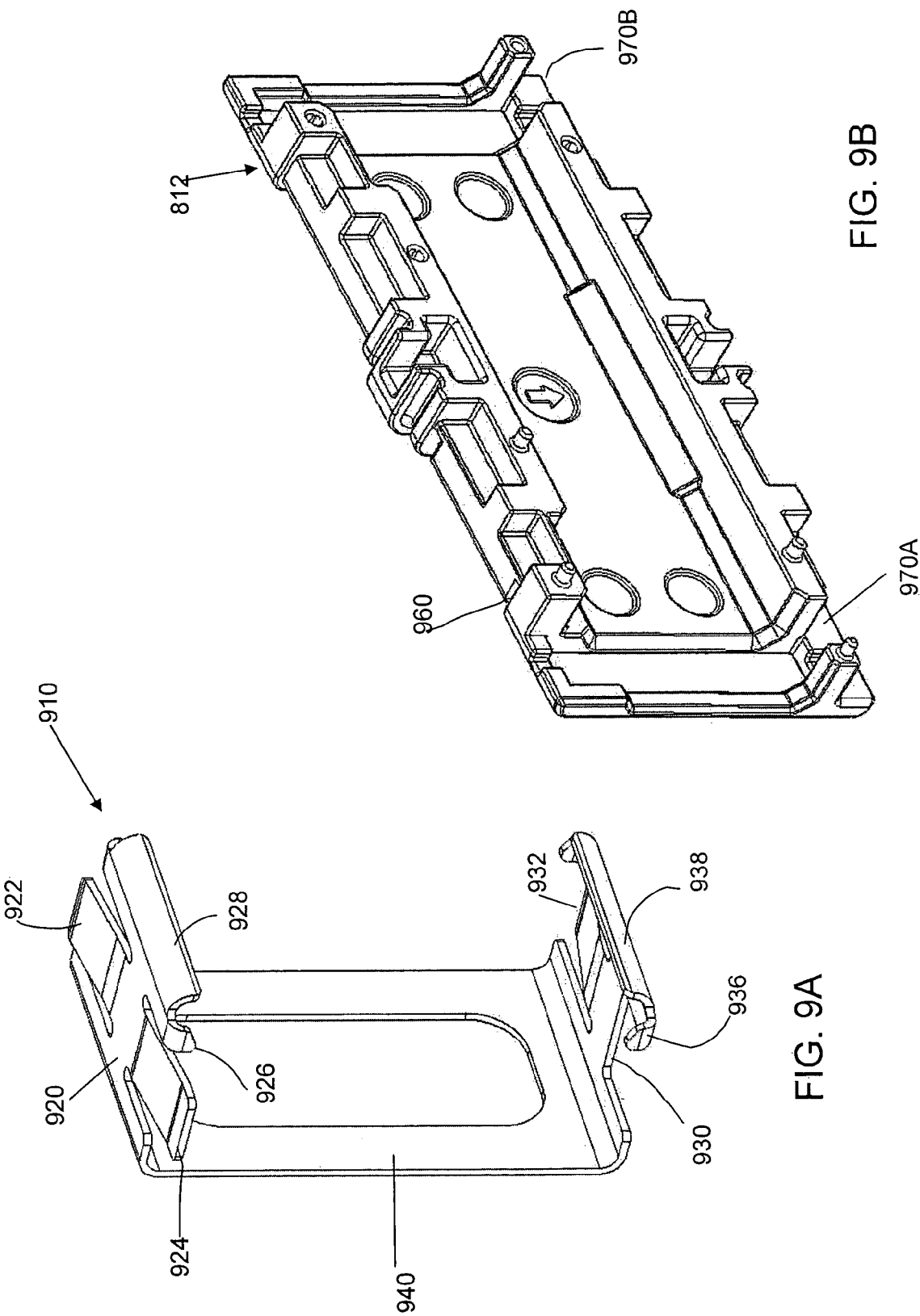

OPTICAL CONNECTOR ASSEMBLY WITH FEATURES FOR EASE OF USE

BACKGROUND OF INVENTION

1. Field of Invention

This invention relates generally to electronic systems and more specifically to electronic systems using optical fibers to carry data between components of the system.

2. Discussion of Related Art

Many types of electronic systems are known. Common examples of electronic systems are computers, routers and telecommunications switches. Complex electronic systems have long been built as subassemblies that are then integrated into an overall system. Integration requires that data be passed between subassemblies.

Traditionally, integration of subassemblies has included making connections for electrical signals to carry data between the subassemblies. In some systems, printed circuit boards, sometimes called backplanes, are used to carry electrical signals between subassemblies. Backplanes are usually built as printed circuit boards. Conductive traces within the board carry electrical signals and electrical connectors attached to the board allow subassemblies to be connected to those traces.

In some instances, subassemblies are also built on printed circuit boards, called daughter cards. The conductive traces on the daughter cards interconnect electronic components mounted on the board. The traces also connect those components to connectors on the daughter card. The daughter card connectors mate with backplane connectors to allow the electronic circuitry on the daughter card to pass information in the form of electrical signals through the backplane to other subassemblies connected to the backplane. Where interconnections are made through a backplane, all of the subassemblies to be connected together are usually mounted in one housing.

In other instances, electronic systems are made up of subassemblies that are contained in separate housings. The system might be too big to fit in a single enclosure or might require subassemblies located in physically separate locations. For example, data storage farms are made of interconnected storage units because it is likely that one unit containing all the necessary circuitry would be too large to easily make in a single housing. Routers and switches in networks are made as separate pieces to allow the network to span a wide geographic range. A system also might be made in separate components as a matter of convenience. For example, a system might be made in modules to allow systems of many different sizes to be constructed by integrating different numbers of modules.

Where systems are assembled from separate components, cables are often used to interconnect the components. Electronic components that are intended to be integrated into a much larger system often have "panels" or "bulkheads" to which cables interconnecting systems can be connected.

Often, the panel on a subassembly contains electrical connectors. Inside the subassembly, these connectors might be connected to backplanes or daughter cards or otherwise tied into the system. On the outside of the subassembly, the connectors are shaped to receive connectors on the ends of cables. In this way, cables can be plugged into panels to interconnect the subassemblies.

As electronic systems became more powerful, the data rate between subassemblies increased. To carry more data, optical interconnections were often used. Rather than transmit data as electrical signals on conductors, optical interconnections transmit data as modulated light in a structure that acts as an optical waveguide—often an optical fiber. To facilitate the interconnection of subassemblies using optical fibers, optical connectors have been developed. Both backplane/daughtercard and panel type optical connectors are known.

Several problems exist with optical interconnections that do not exist with corresponding electrical connectors. One particular problem is that the optical fibers must be aligned with much higher precision than electrical conductors for optical connectors to reliably transmit signals.

Alignment in optical connectors is often achieved through the use of several levels of alignment mechanisms. At the most precise level, the fiber in both halves of the connector is held in ferrules. The ferrules are precision manufactured components that contain alignment features—often posts and holes that are made with very tight tolerance that ensures the fibers are properly aligned when the posts are in the holes.

However, for the ferrules to align the fibers, the ferrules must first be aligned such that the posts engage with the holes. This level of alignment is often provided through a connector housing. The connector housings also have features that, when interlocked, ensure that the ferrules will be aligned with sufficient precision.

Another level of alignment is often used to ensure the housings line up and also to hold the connectors together when mated. This level of alignment is sometimes called an adapter. In a simple form, an adapter can be a sleeve into which two connectors can be inserted from opposite directions. The sleeve forces the connector housings into alignment when they come together in the center of the sleeve. Latching features can be incorporated into the sleeve to hold the connector housings together.

Examples of optical connector systems can be found in U.S. patent application Ser. No. 10/243,458, filed Sep. 13, 2002, entitled Techniques for Forming Fiber Optic Connections in an Modularized Manner; U.S. Patent Application 2003/0044127 filed Jul. 16, 2002 entitled Modular Fiber Optic Connection System; U.S. patent application Ser. No. 10/326,480 entitled Latch and Release System for a Connector, filed on Dec. 20, 2002, by Roth, et al. all of which are hereby incorporated by reference in their entireties.

The above referenced applications describe optical interconnection systems that use ferrules, housings and adapters for alignment. The adapters used for the backplane/daughter card interconnection in some of the examples have several sleeves tied together in a row. In this way, connections between many fibers can be made at one time.

Herein, an improved adapter will be described in connection with a preferred embodiment that would most likely be applied in a commercial setting to create a panel type connector assembly. However, it should be appreciated that the term adapter is used to broadly refer to an adapter as might be used in a panel connector or a backplane style connector.

It would be highly desirable for an optical interconnection system to be easy to make and use. For example, it would also be desirable to provide an optical interconnection system in which the connector housings can be easily inserted and removed from an adapter. It would also be desirable if the connector system reduced the possibility of an assembly error in the interconnection of the electronic system.

SUMMARY OF INVENTION

It is an object of the invention to provide an optical interconnection system that is easy to make and use.

The foregoing and other objects are achieved in an optical interconnection system with an adapter. In one aspect, the adapter includes a latch release mechanism that is easy to operate. In a preferred embodiment, the latch comprises a movable member with interconnected segments. One of the segments includes a tab that allows a force to be generated by one or more human fingers either pushing on the tab or squeezing the connector. Motion of the segment containing the tab causes the interconnected segment to move in unison. Sufficient motion of one segment causes the interconnected segment to move clear of an interlocking feature on a connector housing that In another aspect, the optical interconnection system has modular identification members. In a preferred embodiment, the identification members are made in different colors. Corresponding identification members are used on components of the interconnection system that should be plugged together when the system is assembled.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 9A is a sketch of a clip for use in the adapter of FIG. 8 and

FIG. 9B is a sketch of a side of the adapter of FIG. 9A.

DETAILED DESCRIPTION

Figure 1:
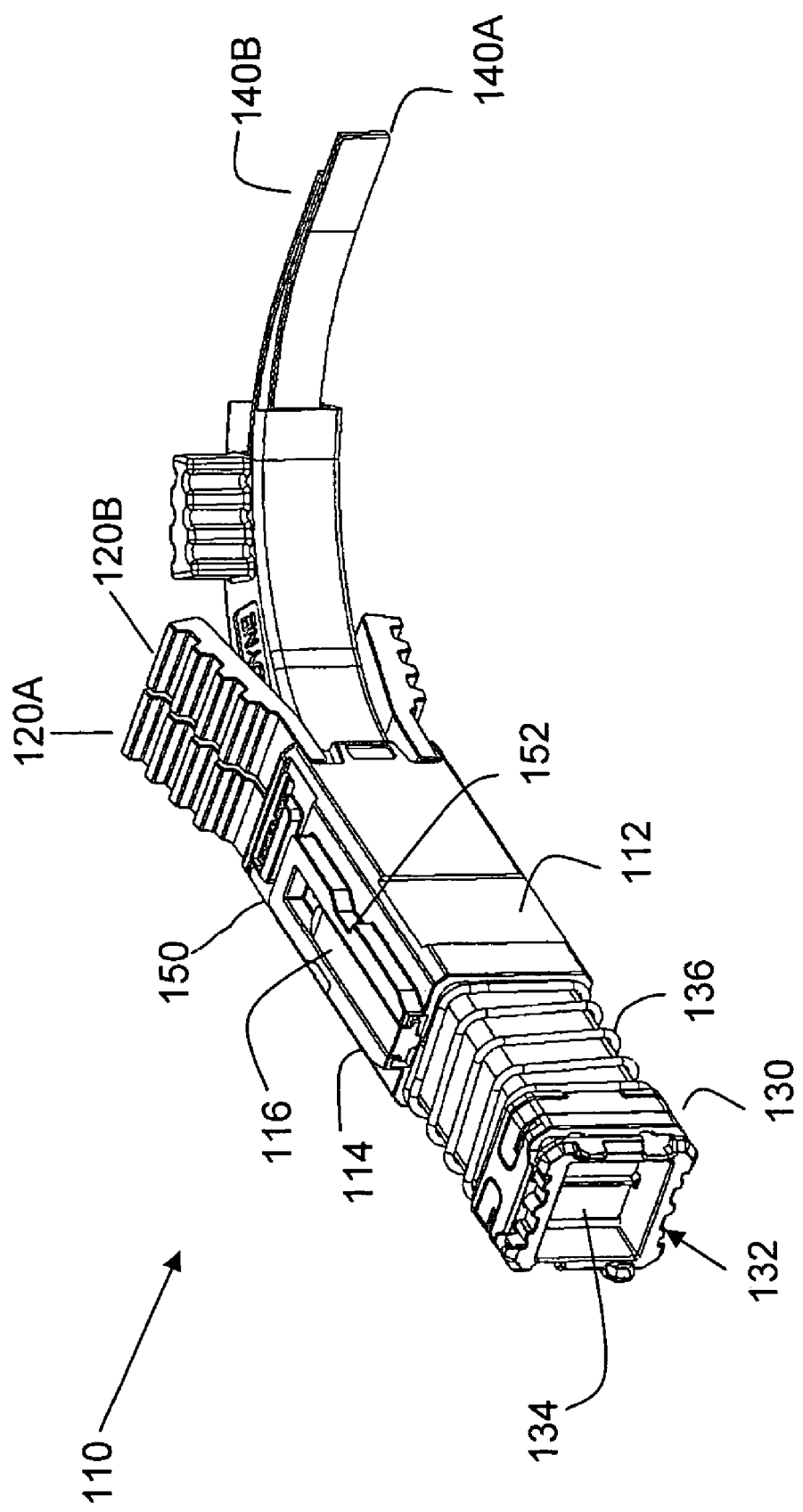
FIG. 1 is a sketch of a fiber optic connector.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 shows optical connector 110. Opitcal connector 110 includes body 112. In the embodiment of FIG. 1 connector 110 is a duplex connector. It receives two ferrule carriers 120a and 120b. Ferrules mounted on ferrule carriers 120a and 120b are held within body 112.

Connector 110 also includes a door assembly 130. Door assembly 130 slides relative to body 112. Spring 136 biases door assembly 130 forwards. When door assembly 130 is in the forward position, doors 134 are closed. When door assembly 130 is pushed towards body 112, doors 134 swing open. When doors 134 open, ferrules within connector 110 are exposed through matting face 132.

Connector 110 is made to be mated to another connector of similar design. When the matting faces 132 of the connectors are pressed together, the door assemblies 130 of each of the connectors is pressed towards its respective body 112. The action of pressing the connectors together opens the doors 134 and allows the ferrules inside each of the connectors 110 to engage.

For the connectors to mate, the matting faces 132 of the two connectors must be aligned. Also, the connectors must be held together to ensure the doors 134 stay open and the ferrules in the respective connectors remained pressed together. To provide alignment of connectors and to ensure the connectors stay pressed together, a sleeve or adapter is normally used. Each of the connectors such as 110 is pressed in to the adapter and latched to hold it in position when the connectors 110 mate.

In the description that follows, a panel adapter will be described. A panel adapter might be used, for example, to allow an optical connector to complete an optical connection from one electronic system to another. However, the concepts that will be described might also be used in connection with sleeves or adapters used to make back plane connectors or connections in other applications.

To facilitate latching of connector 110 to an adapter, body 112 includes latch portions 114. To facilitate removal of connector 110 from an adapter, body 112 includes a release portion 116. Release portion 116 is captured within a channel in body 112. Connector 110 includes a spring that presses releases portion 116 forward and channel 114 to the position shown in FIG. 1.

When connector 110 is pressed into an adapter, release portion 116 engages an abutment within the adapter. As connector 110 is pressed further into the housing, release portion 116 will be forced by the abutment rearward in the channel formed in housing 110. When connector 110 is latched within the adapter, release portion 116 will be held in its rearward position. In this position, the spring (not shown) will be compressed. When the latch holding connector 110 within the adapter is released, the spring force created between release portion 116 and the abutment inside the adapter ejects connector 110 from the adapter. Release portion 116 is included in the preferred embodiment. However, it is not critical to the invention.

Connector 110 is shown with fiber optic cables 140a and 140b extending from it. In the embodiment of FIG. 1 two flat cables 140a and 140b are shown. FIG. 1 illustrates a duplex connector containing two ferrules, each aligning multiple fibers. Such multifiber ferrules are commercially available and are sometimes referred to as MT ferrules. The invention is not limited to use in connection with MT ferrules.

Figure 2:
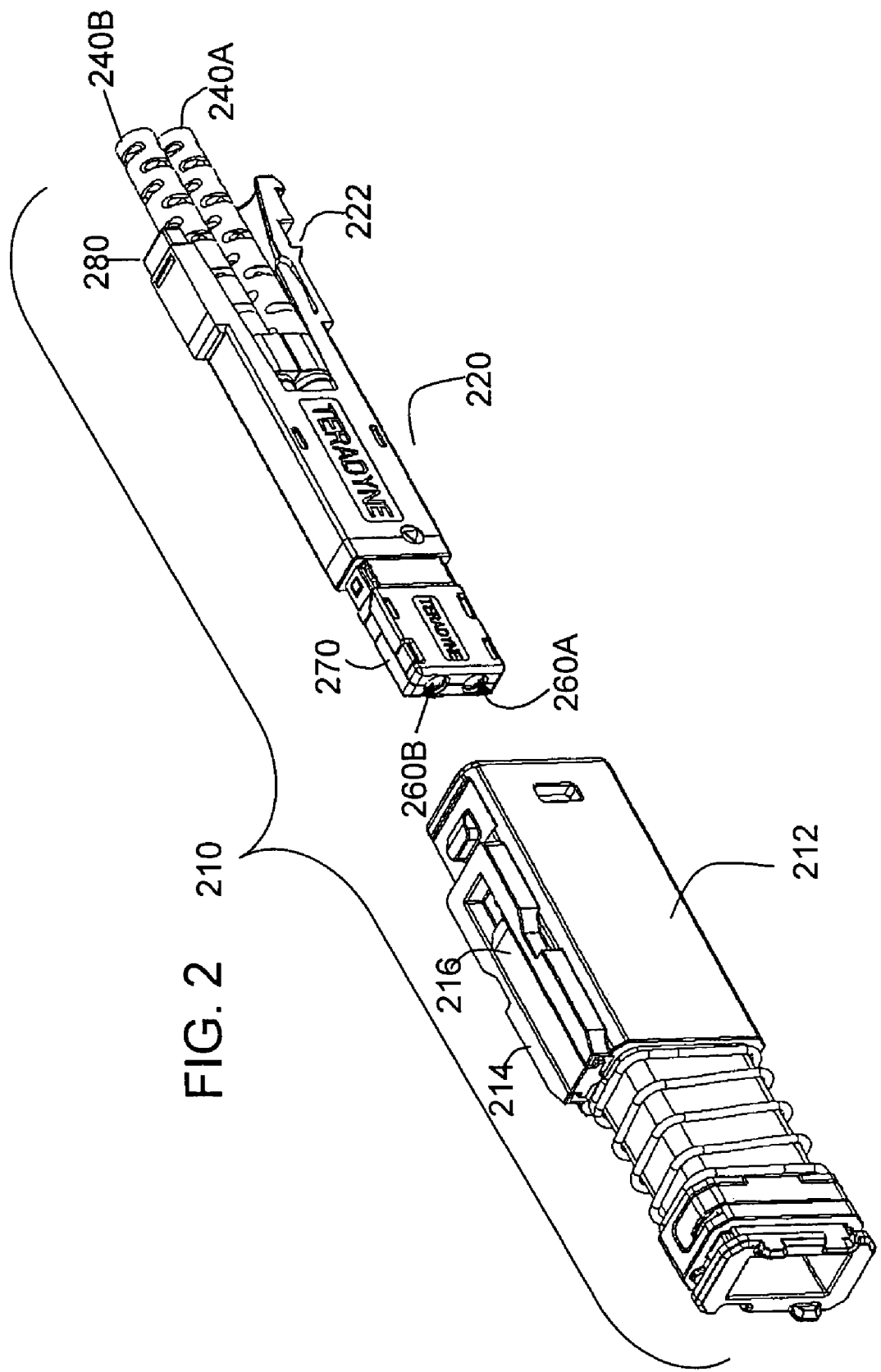
FIG. 2 is a partially exploded view of a fiber optic connector.

FIG. 2 shows a connector 210 adapted for use with single fiber ferrules. Single fibers, encased in a protective boot, are shown extending from the rear surface of ferrule carrier 220. In the illustrated embodiment, fibers 240a and 240b are shown. Fibers 240a and 240b connect with ferrules 260a and 260b respectively. In this embodiment, single fiber ferrules, such as industry standard cylindrical ferrules are used. Ferrule carrier 220 includes a cap 270 that includes alignment features for the ferrules. Further details of a single fiber connector may be found in our copending U.S. patent application entitled "Modular Fiber Optic Connector System" filed on the same date as this application, which is incorporated by reference herein.

To make optical connector 210, ferrule carrier 220 is inserted within body 212. Latch 222 engages a complimentary latching feature inside body 212 to hold the ferrule carrier 220 in body 212. Ferrule carrier 220 includes a color chip 280 that aids in assembly of electronic systems using optical fiber interconnects. Color chips will be explained in greater detail below in connection with FIG. 7b.

Figure 3:
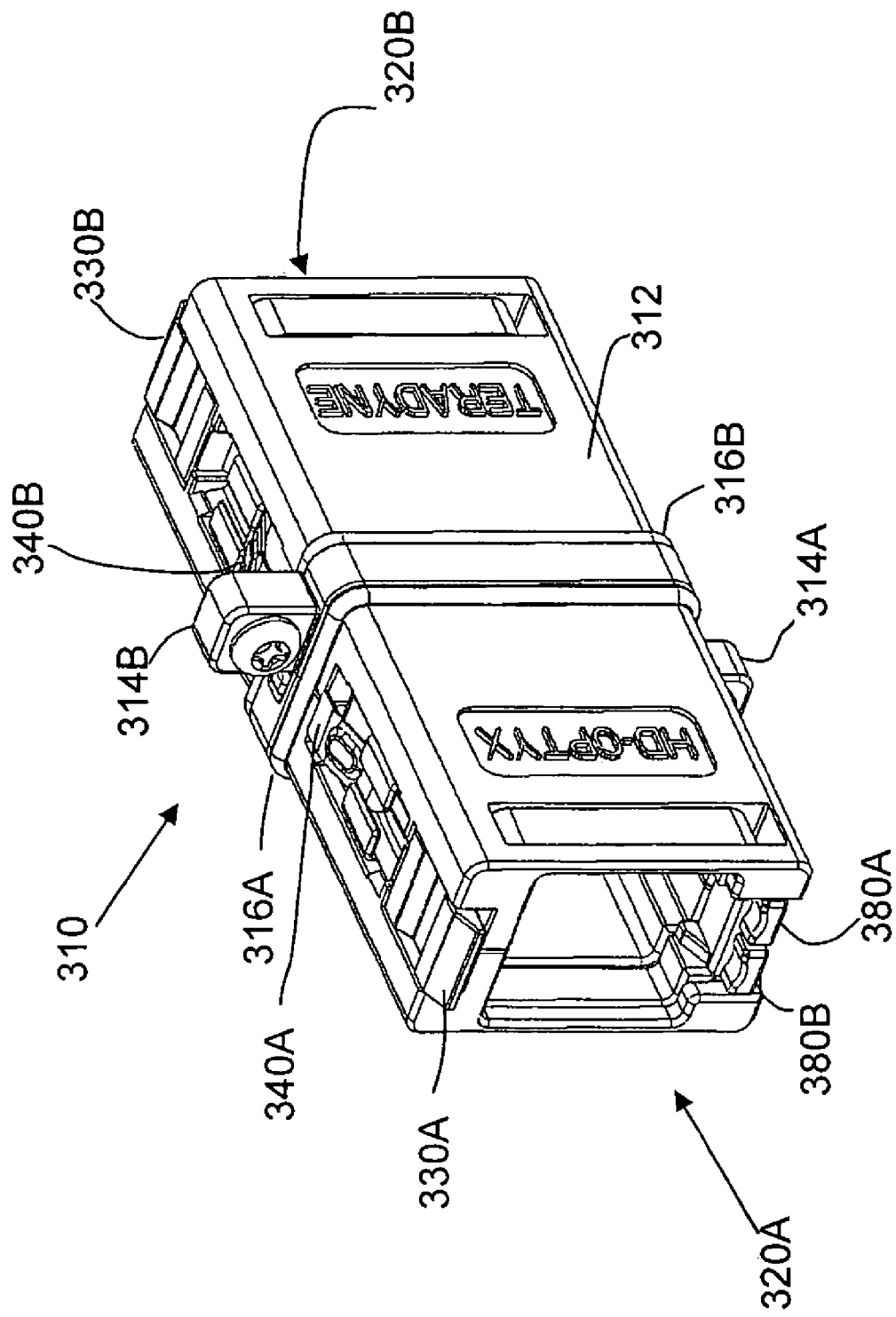
FIG. 3 is a sketch of an adapter for use with a fiber optic connector.

FIG. 3 shows an adapter 310 that can be inserted in a panel or bulkhead of an electronic system. Adapter 310 is made of a shell 312. Shell 312 has openings 320a and 320b that are sized to receive optical connectors. Adapter 310 is sized to receive a duplex connector such as shown in FIG. 1. However, it should be appreciated that a similar adapter could be constructed to receive a connector such as 210 that contains only a single ferrule carrier.

Shell 312 includes flange inserts such as 314a and 314b. Flange inserts 314a and 314b allow adapter 310 to be attached to a bulkhead or panel in an electronic assembly. In the embodiment illustrated in FIG. 3, flange inserts 314a and 314b are sized to receive a screw that may be screwed into the panel.

Adapter 310 also includes gaskets 316a and 316b. Gaskets 31 6a and 316b are made of a compliant conductive material. Gaskets such as 316a and 316b seal openings in the panel into which adapter 310 is inserted to prevent electromagnetic interference from either entering the electronic assembly through the opening made for adapter 310 or from exiting the electronic assembly through that opening. In the embodiment shown, two gaskets are incorporated into the adapter. Regardless of which end of the adapter is pressed into an opening in a panel, one of the gaskets will press against the panel.

Adapter 310 includes release members 330a and 330b. Release member 330a allows a connector latched with an opening 320a to be released. Release member 330b allows a connector latched with an opening 320b to be released.

Adapter 310 also includes color chips. In FIG. 3, color chips 380a and 380b are visible. Color chips 380a and 380b are associated with opening 320a. Corresponding color chips (not visible) may also be associated with opening 320b.

Figure 4:
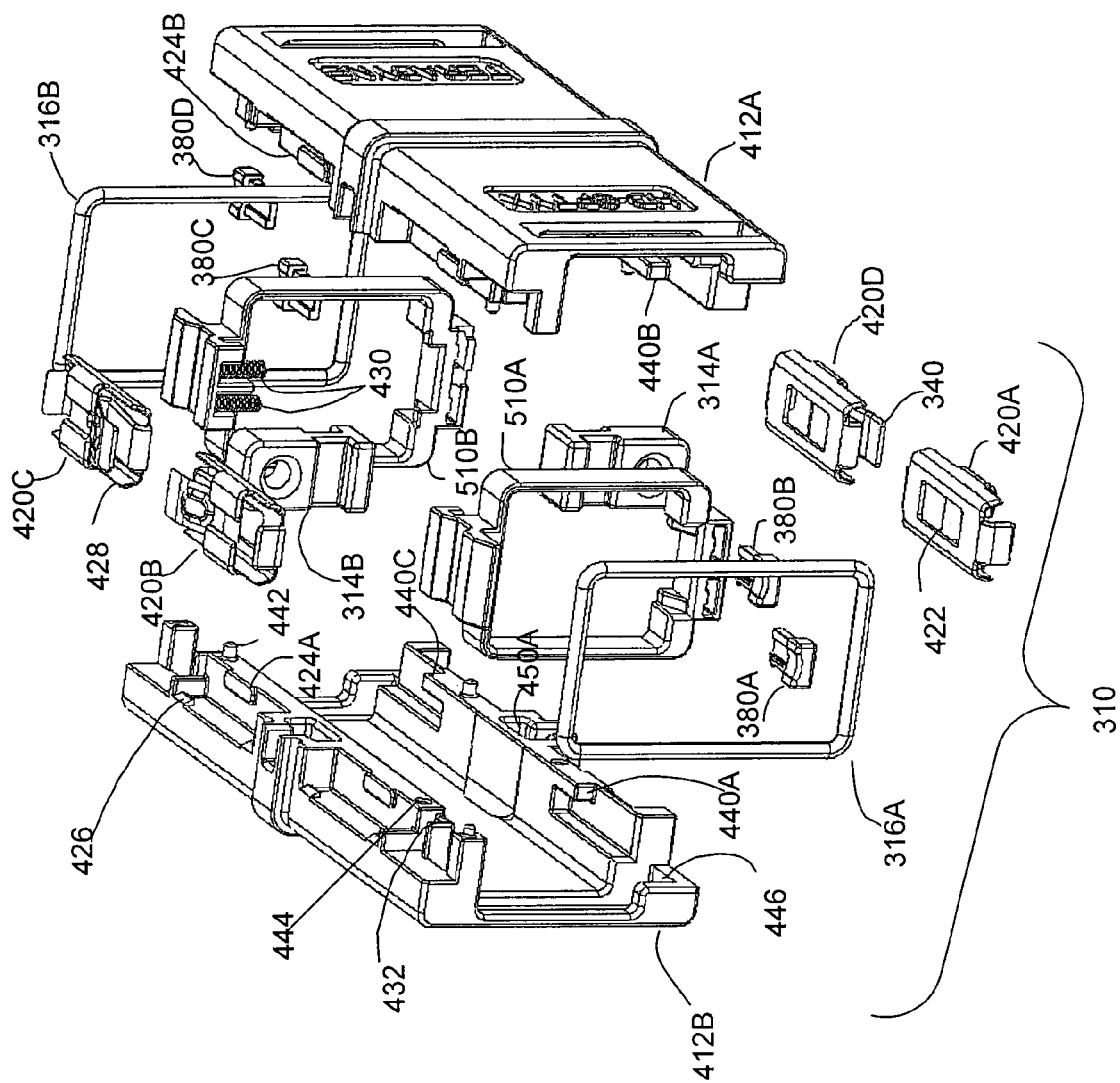
FIG. 4 is an exploded view of the adapter of FIG. 3.

FIG. 4 shows adapter 310 in an exploded view. Adapter 310 is made up of two shell portions 412a and 412b. In the preferred embodiment, shell portions 412a and 412b are identical. Shell portions 412a and 412b are held together by clips 420a, 420b, 420c and 420d. Alignment features such as posts 442 and holes 444 aid in proper positioning of shell portions 412a and 412b.

When shells 412a and 412b are properly positioned, bosses such as 424a and 424b will align. Openings 422 in clips such as 420a, 420b, 420c and 420d fit over bosses such as 424a and 424b. When a clip such as 420c is pressed against shell portions 412a and 412b, wings 428 slip under tabs such as 426. In this way, bosses 424a and 424b will be held together within the opening 422 of the clip 420c.

The interior surfaces of shells 412a and 412b are shaped to provide a channel 446. Latch rings 510a and 510b fit within the channel such as 446. Channel 446 is shaped to allow latch rings 510a and 510b to slide up and down.

Springs 430 are attached to each of the latch rings 510a and 510b. For example, springs 430 fit within a channel such as 432. Springs 430 bias latch rings 510a and 510b into a normally upwards state. However, latch rings 510 may still be pressed downwards within channels such as 446. The operation of latch rings 510a and 510b are described in connection with FIG. 5 below.

Flange inserts 314a and 314b are also shown. Flange inserts have T-shaped portions that fit within openings such as 450a. When shell portions 412a and 412b are locked together, flange inserts 314a and 314b are held in place within openings 450a.

Color chips such as 380a, 380b, 380c and 380d are also shown. These color chips lock within openings in latch rings 510a and 510b.

Catches 340 are formed by extensions on clips 420. In a preferred embodiment clips such as 420a, 420b, 420c and 420d are stamped and formed from a springy metal. Catches 340 can be compressed as the adapter is pressed into an opening of a panel. But, once the adapter is pressed into the panel far enough so that catch 340 clears the wall, it will spring back to an extended state, preventing removal of the adapter. Upper and lower catches are included on both sides of the adapter. This configuration allows either end of the adapter to be inserted in a panel.

As was described above, connectors to be inserted into adapter 310 include release portions such as 116. When a connector such as 110 is inserted into adapter 310 release portion 116 engages an abutment. FIG. 4 shows an abutment made of pieces 440a and 440b to engage a connector inserted into opening 320A. A similar abutment is formed within opening 320B, from abutment 440C and a complementary potion inside shell 412A.

Figure 5:
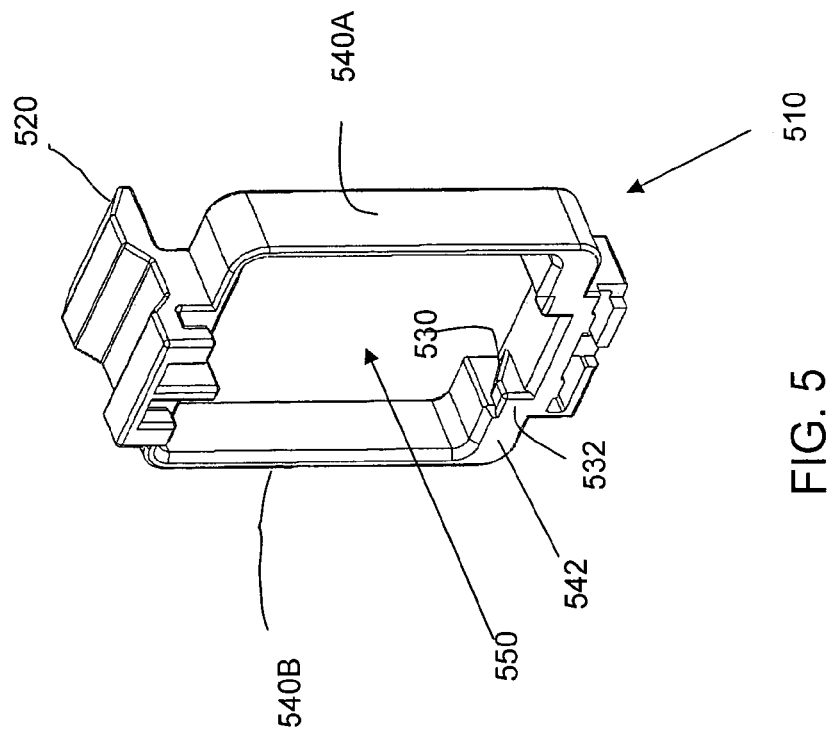
FIG. 5 is a sketch of a latching ring used in the adapter of FIG. 3.

FIG. 5 shows latch ring 510 in greater detail. Latch ring 510 includes tab 520. As shown in FIG. 3, tab 520 is accessible from the exterior of adapter 310. In use, downward pressure on tab 520 releases a connector held within adapter 310.

Latch ring 510 includes sides 540a and 540b. Sides 540a and 540b fit within channels such as 446 (FIG. 4). Sides 540a and 540b also couple tab 520 to latch member 542. Downward motion of tab 520 also causes downward motion of latch member 542.

Latch member 542 includes tapered surfaces 530. As a connector such as 110 (FIG. 1) is inserted through opening 550, latch portions 114 will engage tapered surfaces 530. Pressure against tapered surfaces 530 causes downward pressure on the entire latch ring 510. When connector 110 is fully inserted into adapter 310, latch portions 114 will slide past tapered surfaces 530. Without latch portions 114 providing a force on tapered surfaces 530, spring force generated by springs 430 will cause latch ring 510 to move upwards. As latch ring 510 moves upwards, latch surfaces 532 engage rear surfaces 150 (FIG. 1) of connector 110. In this position, connector 110 is locked within adapter 310.

To release connector 110 from adapter 310, downward pressure can be exerted on tab 520. This pressure will cause latch ring 510 to move in a downward direction until latch surfaces 532 are clear of rear surface 150 (FIG. 1). With latch surfaces 532 clear of rear surface 150, the force of release portion 116 (FIG. 1) pressing against abutment 440 will cause the connector to eject from adapter 310.

Latch portion 114 (FIG. 1) is designed to allow two levels of latching. Connector 110 is partially inserted into adapter 310, latch member 114 will slide past latch surface 532 only to the point that latch surface 532 engages intermediate surface 152 (FIG. 1). Two levels of latching is an optional feature.

Figure 6A:
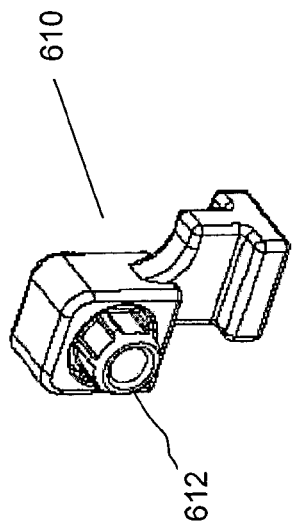
FIGS. 6A, 6B and 6C are sketches of alternative flange inserts that might be used in the adapter of FIG. 3.
Figure 6B:
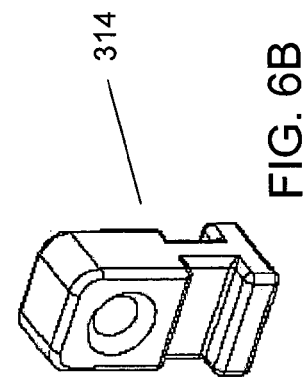
Figure 6C:
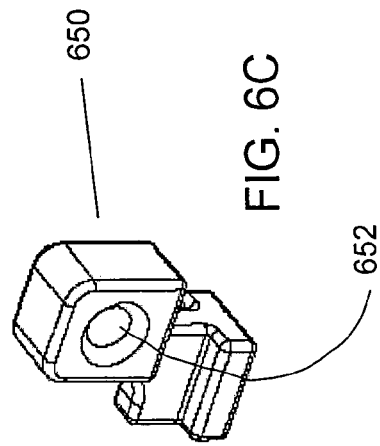

FIG. 6A, 6B and 6C show alternative embodiments of flange inserts 314. FIG. 6b shows a flange insert such as flange insert 314a or 314b. When used in an adapter such as 310, flange insert 314 allows the adapter to be mounted to a panel with a screw. The mounting hole is positioned generally in the center of the adapter.

FIG. 6C shows an alternative configuration of a flange insert. Flange insert 650 has the same T-shaped base as flange insert 314. However, flange insert 650 includes a screw hole 652 offset from the center.

FIG. 6A shows a flange insert 610. Flange insert 610 has the same T-shaped base as flange insert 314. Rather than providing a screw hole, flange insert 610 includes a hub 612 that can be pressed into a hole within a bulkhead to which adapter 310 might be mounted. Hub 612 is offset from the center. By providing multiple alternative configuration of flange inserts, multiple mounting configurations for adapters can be used.

For example, when adapters are to be mounted side by side, flange inserts such as 314 in FIG. 6B might be used. However, when adapters are to be mounted to a bulkhead one above the other, flange inserts such as 610 or 650 might be used. By offsetting the flange insert on the top of one connector in the opposite direction from the flange insert of the bottom of the connector above it, screws holding the two adapters to the bulkhead will be aligned side by side. In this way, the adapters may be mounted closer together on the bulkhead.

Figure 7B:
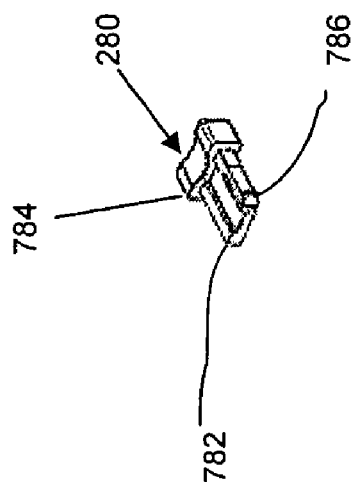
FIG. 7B is a sketch of a color chip.
Figure 7A:
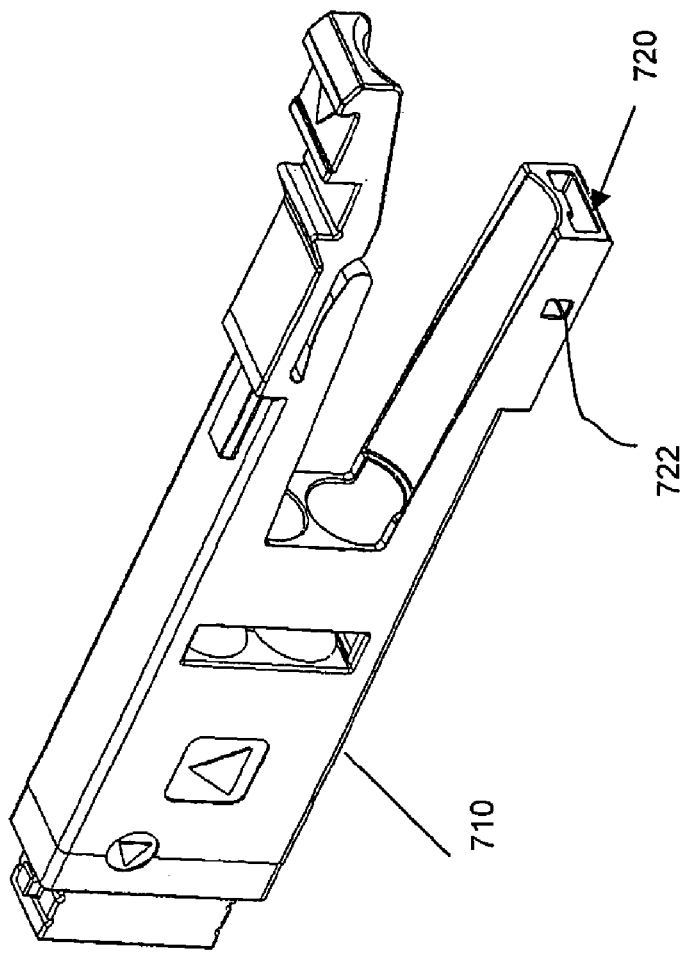
FIG. 7A is a sketch of a ferrule carrier adapted to receive a color chip.

FIG. 7a shows a portion of a ferrule carrier such as ferrule carrier 220 (FIG. 2). Support member 710 includes an opening 720 into which a color chip such as color chip 280 (FIG. 7B) can be inserted. Here, the opening 720 is in the rearward surface of support 710. This rearward surface is visible from the rear of a connector such as connector 210 when assembled. This rearward surface is also visible when connector 210 is inserted in an adapter.

Opening 720 includes a window 722. Window 722 allows a color chip, once inserted, to be removed.

FIG. 7B shows color chip 280 in greater detail. Color chip 280 includes an interior portion 782. Interior portion is inserted within opening 720. Color chip 280 also includes an exterior portion 784. When color chip 280 is inserted with an opening 720, exterior portion 784 remains outside of opening 720 and is therefore visible. Interior portion 782 includes a latch 786. Latch 786 is formed on a cantilever portion of interior portion 782. When color chip 280 is inserted into opening 720, latch 786 is visible in window 722. Latch 786 latches to a side of window 722.

When color chip 280 is inserted in window 720, latch 786 holds it in place. By inserting a tool into window 722, latch 786 can be released. In this way color chip 280 may be removed from support 710. The ability to insert and remove color chips such as 280, allows components of a connector assembly to be color coded for easy assembly. For example, FIG. 3 shows color chips such as 380a and 380b attached in an adapter 310. Similar mounting arrangements can be used within adapter 310 to insert or remove color chips. It is intended that color chips will be inserted in connectors and adapters to indicate which connectors should be inserted into which adapters. For example, connector 110 in FIG. 1 includes two ferrule carriers 120a and 120b. A red color chip might be mounted to ferrule carrier 120a and a blue color chip might be mounted to ferrule carrier 120b. Likewise, color chip 380a might be a red color chip and color chip 380b might be a blue color chip. In this way, when connector 110 is mounted in adapter 310, the red color chip of ferrule carrier 120a would be adjacent red color chip 380a of adapter 310. Likewise the blue color chip of ferrule carrier 120b would be adjacent the blue color chip 380b.

Because color chips can be inserted and removed in both the ferrule carriers and the adapters, great flexibility is provided in color coding the components the optical connector assembly. Also, the number and complexity of unique components in the optical interconnection system is reduced. Multiple combinations of color coded connectors can be created with the only unique pieces being the color chips.

Figure 8:
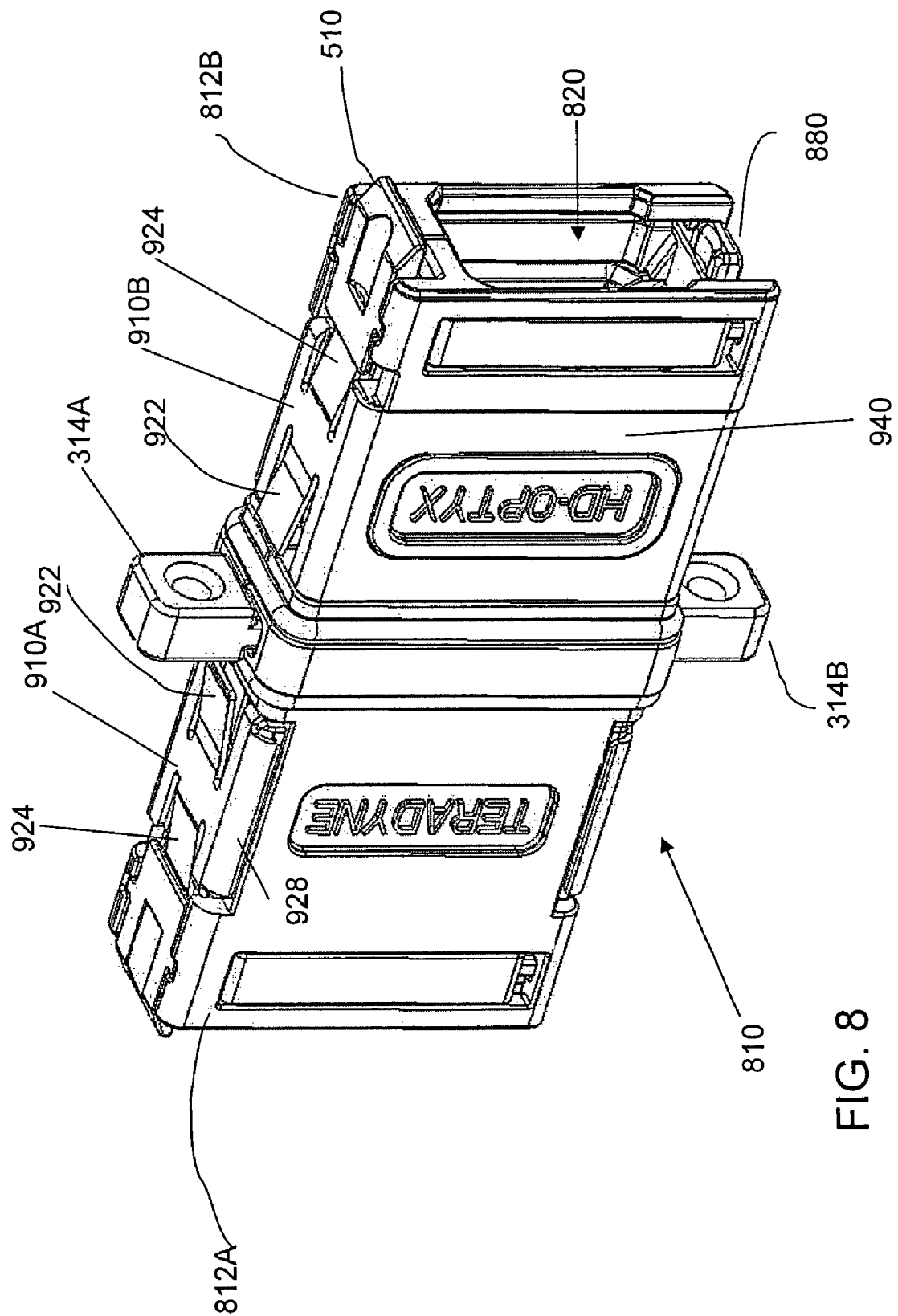
FIG. 8 is sketch of an alternative embodiment of the adapter of FIG. 3.

FIG. 8 shows an alternative embodiment of an adapter. Adapter 810 is sized to receive a connector with a single ferrule carrier such as connector 210. Adapter 810 is made from shell portions 812a and 812b. Flange inserts 314a and 314b are used for mounting adapter 810 to a panel. The adapter 810 also includes two latch rings 510 to latch connectors inserted from opposite ends of adapter 810. Shell portions 812a and 812b are held together with clips 910a and 910b as described in more detail in connection with FIG. 9 below. Because adapter 810 is intended for use with a connector having a single ferrule carrier, a single color chip 880 is shown adjacent the openings 820 in which the connector is inserted.

Clip 910 is shown in greater detail in FIG. 9A. Clip 910 is generally c-shaped. It has an upper surface 920, a lower surface 930 and side surface 940. Preferably clip 910 is stamped and formed from a single sheet of springy metal. Upper surface 920 includes engagement features 926 and 928. Engagement features 926 and 928 engage corresponding features on the shell portions 812. Engagement features 936 and 938 on lower surface 930 similarly engage features on shell portions 812. For example, features 936 engage slots 960, which are visible in FIG. 9b.

As can be seen in FIG. 8, side surface 940 presses against the outer surface of shell portion 812. In this way, shell portions 812a and 812b are held together.

Upper surface 920 includes a catch 922. As can be seen in FIG. 8, catch 922 forms a compliant beam that can be compressed to allow adapter 810 to be inserted into an opening in a bulkhead. When adapter 810 is inserted sufficiently far into the opening in the bulkhead, catch 922 will clear the bulkhead and spring back to its uncompressed position. In it uncompressed position catch 922 will engage the interior side of the bulkhead, preventing adapter 810 from being removed. As can be seen in FIG. 8, adapter 810 includes catches that allow either end of adapter 810 to be inserted and latched in that bulkhead. A similar catch is included on lower surface 930 of clip 910.

Upper surface 920 also includes a spring 924. As shown in FIG. 8, spring 924 fits under latch ring 510. Spring 924 takes the place of springs 430a. In contrast to the coiled springs 430, spring 924 is formed from a springy beam.

FIG. 9B shows in greater detail the interior side of shell portion 812. Channels 970a and 970b are provided for receiving latch rings 510. Alignment features such as post and holes are also shown. And, as with shell portions 412a or 412b, channels for receiving flange inserts are also provided.

The specific materials used to make the components of the optical interconnection system are not critical to the invention. It is preferred that the housing members be made from a conductive material to reduce EMI associated with openings in the electronic assembly in which optical connectors are used. For example, adapter shell 312 and connector body 112 or 212 might be die cast.

The features described above result in an optical connector assembly that is easy to construct and operate. One aspect is that a connector can be unlatched from the adapter easily. A technician can press on the tab portion of latch ring 510 with one finger or with a simple tool. Alternatively, the technician can squeeze the top and bottom of the adapter with a two-finger pinching action to remove the connector from the adapter. As connector assemblies become smaller and move highly integrated, easy insertion and removal of components provides a significant benefit.

Further, the use of easily removable and insertable identifying members, such as color chips, reduces assembly errors. As connector assemblies are constructed, color chips can be easily added. Or, as systems are reconfigured or connectors or cables are used for other applications, the color coding can be easily changed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

As one example, the locking member of the preferred embodiment is illustrated as a ring. Such a shape is not required. The locking member might be U-shaped, with a tab mounted at the base of the U. Features on the sides of the U could engage complementary features in a connector housing when the U is biased upwards by the spring. By pressing down on the tab, the sides of the U would slide free of the complementary features, thereby releasing the connector from the latch.

Such a structure would also be operative if only one side of the U were present, resulting in an L-shaped locking member.

Moreover, it would be possible to place the tab on the same member that contained the latch. It should also be appreciated that the "tab" need not be created by a projection as shown in the pictures. A "tab" could be created by providing an opening in the housing through which a portion of the locking member is exposed.

It should be appreciated that color chips might be inserted at the factory or by the user of an optical connector. Further, the latch described above for color chips allows them to be removed by the customer and, if desired, changed to other colors.

The color chips in the presently preferred embodiment are solid color chips. However, patterns of color could be used. For example, a chip with red stripes would be considered a different color than a solid red chip or a chip with blue stripes.

Also, it is described that color chips are used to provide a visible indicator of the components that are to be connected. Other visible indicators could be used. For example, chips might be made with differently shaped exterior portions. Also, the indicators, could be in the texture of the chip rather than its color. As a further variation, markings on the chips might also visually distinguish connectors and mounting locations As yet a further example, a locking ring with a tab extending from the adapter housing is shown. It is not necessary that the tab extend from the housing to be accessible.

Further, an adapter is described in which the walls of the adapter guide the connector into alignment and the locking member simply holds the connector in place. In the illustrated embodiment, the sides of the locking member are smooth and do not latch to the connector body. It is possible that the sides of the locking member could guide the connector into alignment. In this scenario, the sides of the locking member would partially define the opening into which the connector is inserted.

As another example, identifying chips made of colored plastic were described. Other means for identification could be used. Chips with different shape or texture could be used. Also, the identification means need not be limited to visual identifying means.

Accordingly, the foregoing description and drawings are by way of example only.

What is claimed is:

1. An adapter for an optical connector assembly of the type used to receive at least one optical connector, comprising:
   a) a shell having an opening therein and
   b) a locking member, movably mounted to the shell, having a first side and a second side, the second side coupled to the first side, the first side and the second side each adjacent the opening, the first side having a tab thereon and the second side having at least one locking feature extending into the opening, shaped to engage a complementary feature on a connector inserted in the shell, whereby pressure on the tab causing movement of the locking member disengages the locking feature from the complimentary feature on the connector inserted in the shell.

2. The adapter of claim 1 wherein the locking member is in the shape of a ring and the first side and the second side form opposing sides of the ring.

3. The adapter of claim 1 wherein the shell has a channel formed in an interior surface of the opening and the locking member is disposed within the channel.

4. The adapter of claim 3 additionally comprising a spring biasing the first side away from the opening.

5. The adapter of claim 1 wherein the shell is formed from two halves held together and the locking member is slidably retained between the two halves.

6. The adapter of claim 5 wherein the two halves are similarly shaped.

7. The adapter of claim 5 wherein the two halves are held together by a clip, the clip having a portion projecting from an exterior surface of the adapter, the projecting portion of the clip shaped to secure the adapter to a panel.

8. The adapter of claim 1 wherein the shell comprises an abutment projecting into the opening.

9. The adapter of claim 3 wherein the adapter has a first and second exterior surfaces, with the first exterior surface on the opposite side of the adapter from the second exterior surface, and the channel extends towards but not through the second surface, whereby motion of the locking member in the direction of the second surface is constrained such that the locking member does not extend beyond the second exterior surface.

10. The adapter of claim 1 additionally comprising at least one separable panel attachment member, secured to the shell.

11. An optical connector assembly comprising:
   a) at least one ferrule carrier;
   b) at least one housing, the housing having an opening therein with the ferrule carrier disposed within the opening of the housing;
   c) an adapter, the adapter having an opening therein, with the housing disposed within the opening in the adapter; and
   d) identifying chips mounted in at least two of the ferrule carrier, the housing and the adapter, with the identifying chips positioned to be aligned when the optical connector assembly is assembled.

12. The optical connector assembly of claim 11 wherein the identifying chips comprise colored plastic members.

13. The optical connector assembly of claim 11 wherein each identifying chip comprises a latch portion.

14. The optical connector assembly of claim 13 wherein at least one mounting location comprises a window through which the latch is exposed.

15. An optical connector assembly comprising:
a) at least one ferrule carrier;
b) at least one housing, the housing having an opening therein with the ferrule carrier disposed within the opening of the housing;
c) an adapter, the adapter having an opening therein, with the housing disposed within the opening in the adapter;
d) wherein at least two of the ferrule carrier, the housing and the adapter have mounting locations for identifying chips, with the mounting locations positioned to be aligned when the optical connector assembly is assembled; and wherein the mounting locations comprise openings.

16. The optical connector assembly of claim 15 wherein the mounting locations are on the ferrule carrier and the adapter.

17. The optical connector assembly of claim 16 wherein the mounting locations on both the ferrule carrier and the adapter are similarly shaped.

18. The optical assembly of claim 15 wherein the ferrule carrier has a member coupled thereto extending from the housing and a mounting location is disposed on the member extending from the housing.

19. The optical connector assembly of claim 15 wherein the housing is a duplex housing, having an opening to receive two ferrule carriers and the adapter has two mounting locations, each disposed to be adjacent to one of the ferrule carriers.

20. The optical connector assembly of claim 15 wherein the adapter comprises a locking member through which the housing passes, the locking member slidably mounted in the adapter and having a tab extending therefrom.

21. The optical connector assembly of claim 18 additionally comprising separable panel mounting members.

22. An adapter for on optical connector assembly used to couple optical connectors, comprising:
a) a first shell portion and a second shell portion, each having an exterior surface and an interior surface with the first shell portion and the second shell portion coupled to define an opening with their interior surfaces, with at least one of the first shell portion and second shell portions having a channel formed in its interior surface;
b) a locking member, movably mountable in the channel, the locking member having a first side and a second side, the second side coupled to the first side, the first side and the second side each adjacent the opening, the first side being accessible to the exterior of the shell and the second side having a locking feature shaped to engage a complementary feature on an optical connector; and
c) at least one clip having a compliant member adapted to attach the adapter to a panel extending from an outer surface of at least one of the first shell members and the second shell members.

23. The adapter of claim 22, wherein the outer surface of the first shell portion and the second shell portion contain a groove.

24. The adapter of claim 23 additionally comprising an O-ring formed of a conductive material in the groove.

25. The adapter of claim 22, wherein the clip secures features on the first shell member to a features on the second shell member.

26. The adapter of claim 22 wherein the clip is C-shaped.

27. The adapter of claim 22, wherein the clip has a compliant portion providing a biasing force on the locking member.

28. The adapter of claim 22, wherein color identifiers are attached to the adapter.

29. An optical connector assembly comprising:
a) an adapter, comprising:
i) a shell having an exterior surface and an interior surface bounding an opening;
ii) a latch ring, movably mounted in the shell, having a first side and a second side, the first side and the second side each adjacent the opening, the first side having release member formed thereon and accessible through the exterior surface of the shell and the second side having at least one locking feature extending into the opening; and
b) an optical connector inserted into the opening, the connector having a complementary feature engaging the locking feature of the second side.

30. The optical connector assembly of claim 29 wherein the looking feature comprises a projection having a cammed surface.

31. The optical connector assembly of claim 29 wherein the connector has a housing and a release portion slidably mounted to the housing, and the interior surface of the shell comprises an abutment engaging the release portion.

32. The optical connector assembly of claim 31 wherein the release portion is spring biased whereby the release portion ejects the connector from the adapter when the connector is unlocked.

33. The optical connector assembly of claim 29 additionally comprising a spring between the shell and the latch ring.

34. The optical connector assembly of claim 33 wherein the spring is a coiled spring.

35. The optical connector assembly of claim 33 wherein the spring comprises a compliant beam.

36. The optical connector assembly of claim 35 wherein the shell comprises a first portion and a second portion and, the adapter additionally comprises a C-shaped clip engaging the first shell portion and the second shell portion.

37. The optical connector assembly of claim 36 wherein the spring is integrally formed with the C-shaped clip.

38. The optical connector assembly of claim 15, wherein each of the mounting locations comprises a slot.

* * * * *